United States Patent [19]
Hosono

[11] Patent Number: 5,796,438
[45] Date of Patent: Aug. 18, 1998

[54] METHODS AND APPARATUS FOR INTERPOLATING PICTURE INFORMATION

[75] Inventor: Yoshimasa Hosono, Kanagawa, Japan

[73] Assignee: Sony Corporation, Tokyo, Japan

[21] Appl. No.: 494,103

[22] Filed: Jun. 23, 1995

[30] Foreign Application Priority Data

Jul. 5, 1994 [JP] Japan ................ 6-153979

[51] Int. Cl.$^6$ .................................... H04N 7/01
[52] U.S. Cl. ................ 348/458; 348/910; 348/607; 348/581; 348/564
[58] Field of Search .................... 348/452, 458, 348/441, 553, 910, 552, 578, 580, 581, 564, 588, 699–701, 556, 572, 426, 428; 386/131, 123, 112, 105, 52

[56] References Cited

U.S. PATENT DOCUMENTS

| | | | |
|---|---|---|---|
| 5,294,998 | 3/1994 | Piovoso et al. | 358/428 |
| 5,386,234 | 1/1995 | Veltman et al. | 348/409 |
| 5,386,241 | 1/1995 | Park | 348/515 |
| 5,400,077 | 3/1995 | Cookson et al. | 348/556 |
| 5,410,354 | 4/1995 | Uz | 348/426 |
| 5,461,420 | 10/1995 | Yonemitsu et al. | 348/401 |
| 5,469,223 | 11/1995 | Kimura | 348/568 |
| 5,481,553 | 1/1996 | Suzuki et al. | 371/49.1 |
| 5,515,388 | 5/1996 | Yagasaki | 371/49.1 |
| 5,600,377 | 2/1997 | David et al. | 348/441 |

*Primary Examiner*—Victor R. Kostak
*Attorney, Agent, or Firm*—Limbach & Limbach L.L.P.

[57] ABSTRACT

A method for processing the information of a still picture of high resolution displayed on a television screen is disclosed. The method includes the steps of receiving the picture information encoded by a pre-set encoding method, generating the averaging information specifying which interpolation is to be performed on the received picture information, decoding the picture information by a decoding method corresponding to the encoding method, storing the decoded picture information in a memory, reading out the stored picture information for processing the decoded picture information with interpolation, and outputting the interpolated picture information as a picture for display. An apparatus for carrying out the information processing method is also disclosed.

15 Claims, 10 Drawing Sheets

```
*-------- PICTURE layer ----------------------------------*

0000000000000000
0000000100000000:        0 picture_start_code
      0000000000:       16 temporal_reference
             011:       26 picture_coding_type ,BIDIR
0000000000000000:       29 vbv_delay    0
               :          buffer_fullness=Obyte
               0:       45 full_pel_forward_vector
             001:       46 forward_f_code
               0:       49 full_pel_backward_vector
             001:       50 backward_f_code
               0:       53 extra_bit_picture
              00:  dummy for Byte alingn

*-------- SLICE layer ------------------------------------*

0000000000000000
0000000100000001:       56 slice_start_code
           01010:       88 quantizer_scale
               0:       93 extra_bit_picture
```

|          |   |       |                                      |   |
|----------|---|-------|--------------------------------------|---|
|          | ↑ | 1:    | 94 mb_address_inc                    | 1 |
|          | │ | 10:   | 95 macroblock_type                   |   |
|          | │ |       | macroblock_motion_backward           |   |
|          | │ |       | macroblock_motion_forward            |   |
|          | │ | 010:  | 97 motion_horizontal_forward_code    | 1 |
| ORIGINAL | │ | 010:  | 100 motion_vertical_forward_code     | 1 |
| MB DATA  | │ | :     | forward_motion_vector ( 1, 1)        |   |
|          | │ |       | /* ACTUALLY(0.5,0.5);HALFPEL OF(1,1)*/|   |
|          | │ | 1:    | 103 motion_ horizontal_backward_code | 0 |
|          | │ | 1:    | 104 motion_vertical_backward_code    | 0 |
|          | │ | :     | backward_motion_vector( 0, 0)        |   |

FIG.3A macroblock No.1 (Sq, G, P, S1,MB) = (1,1,1,1,1)
* block Y0                                              no coefficient
* block Y1                                              no coefficient
* block Y2                                              no coefficient
* block Y3                                              no coefficient
* block Cb                                              no coefficient
* block Cr                                              no coefficient SKIPPED NB
```
00000001000:    105 macroblock_escape
00000001000:    116 macroblock_escape
00000001000:    127 macroblock_escape
00000001000:    138 macroblock_escape
00000001000:    149 macroblock_escape
00000001000:    160 macroblock_escape
00000001000:    171 macroblock_escape
00000001000:    182 macroblock_escape
00000001000:    193 macroblock_escape
00000001000:    204 macroblock_escape
00000001000:    215 macroblock_escape
00000001000:    226 macroblock_escape
```

LAST MB DATA
```
           1:   237 mb_address_inc                397
          10:   238 macroblock_type
                    macroblock_motion_backward
                    macroblock_motion_forward
           1:   240 motion_horizontal_forward_code    0 ⎫  MV
           1:   241 motion_vertical_forward_code      0 ⎬ DIFFERENCE
           :       forward_motion_vector ( 1, 1)        ⎭  IS "0"
           1:   242 motion_horizontal_backward_code   0
           1:   243 motion_vertical_backward_code     0
           :       backward_motion_vector( 0, 0)
``` macroblock No.398 (Sq, G, P, S1,MB) = (1,1,1,1,398)
* block Y0                                              no coefficient
* block Y1                                              no coefficient
* block Y2                                              no coefficient
* block Y3                                              no coefficient
* block Cb                                              no coefficient
* block Cr                                              no coefficient 0000: dummy for Byte alingn

METHODS AND APPARATUS FOR INTERPOLATING PICTURE INFORMATION

BACKGROUND OF THE INVENTION

This invention relates to a picture information processing apparatus for processing the information of a high resolution still picture displayed on a television screen.

There has recently been known a disc, termed a photo CD, in which the picture information of high resolution obtained from a photograph is recorded on a multi-media recording medium, for example, compact disc (CD), which is an optical disc type recording medium.

When the picture of the photograph recorded on the disc is appreciated in a household, the picture of the photograph reproduced from the disc is displayed on a usual television receiver configured for receiving television programs.

When picture information of high resolution, besides the picture information of the photograph reproduced from the disc, is displayed on the screen of the television receiver, the picture becomes difficult to view because of flicker which is generated depending on the picture pattern (picture content).

On the other hand, if the picture information is of usual resolution, that is not the picture information of high resolution, is displayed on a screen of a usual television receiver, flickering is produced depending on the picture pattern if the picture corresponding to a frame is displayed with a contracted size by simple thinning out a portion of the television screen.

OBJECT AND SUMMARY OF THE INVENTION

In view of the foregoing, it is an object of the present invention to provide a picture information processing apparatus whereby picture information devoid of flicker may be generated even when displaying on a television screen picture information of high resolution or picture information of usual resolution and a contracted size.

The present invention provides a method including the steps of receiving the picture information encoded by a pre-set encoding method, generating the averaging information specifying which interpolation is to be performed on the received picture information, decoding the picture information by a decoding method corresponding to the encoding method, storing the decoded picture information in a memory, reading out the stored picture information for processing the decoded picture information with the interpolation, and outputting the interpolated picture information as a picture for display.

The averaging information includes the vector information concerning the extent of vertical and horizontal shifting of one-frame picture information for performing averaging interpolation.

The picture information and the averaging information are bitstreams conforming to the MPEG standard.

With an apparatus for processing the picture information according to the present invention, averaging information for averaging a still picture constituting a moving picture sequence is stored in memory means. There is provided a moving picture sequence processing means for processing the averaging information as a part of a pre-set moving picture sequence for displaying a high-definition picture information on a television screen. Picture information free from flicker may be generated speedily and easily when displaying a reduced-size picture of usual definition.

DESCRIPTION OF THE PREFERRED EMBODIMENT

Referring to the drawings, an illustrative embodiment of the present invention will be explained in detail. The picture processing apparatus of the embodiment reproduces an information recording medium on which a moving picture sequence of a MPEG (Moving Picture Expert Group) format as later explained is recorded as a pre-set moving picture sequence, and decodes a moving picture bitstream of the MPEG format for restoring the moving picture. Details of the MPEG system will be discussed subsequently.

Figure 1:
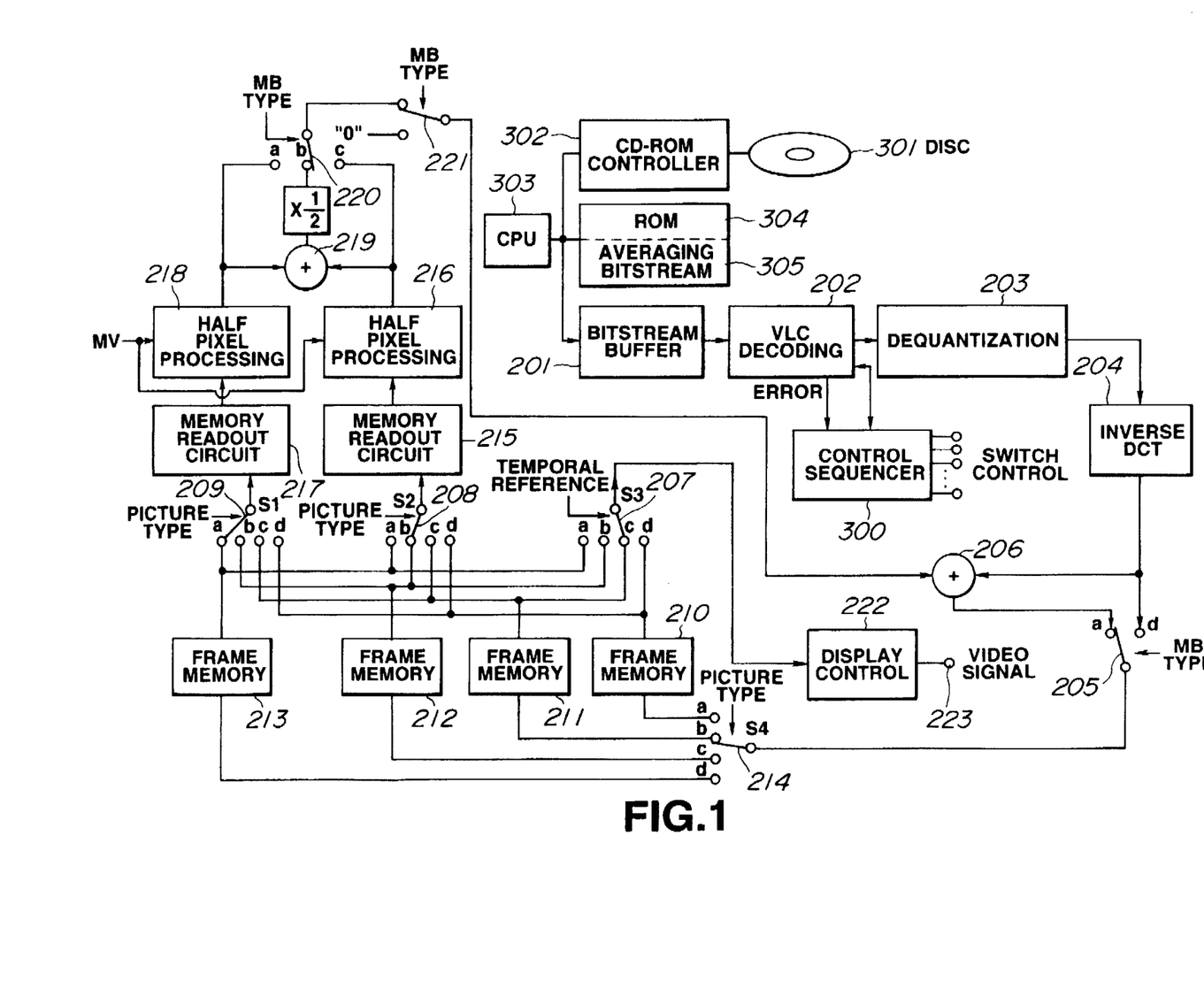
FIG. 1 is a schematic block circuit diagram showing a picture information processing apparatus embodying the present invention.

Referring to FIG. 1, the moving picture sequence of the MPEG format recorded on a so-called CD-ROM disc 301, that is a so-called video CD, is read out by a CD-ROM controller 302, the operation of which is controlled by CPU 303, and an error-corrected MPEG 1 video bitstream is outputted. The CPU 303 performs various operations using the program information stored in a read-only memory (ROM) 304. There is stored in an averaging bitstream storage area, that is an averaging information storage area 305, an averaging bitstream, that is the averaging information according to the MPEG system as later explained. The averaging bitstream thus stored is read out by the CPU 303 operating as controlling means. The number of frames of the averaging bitstream read out is predetermined, and the averaging bitstream is accordingly read out by the CPU 303.

The MPEG1 video bitstream, outputted by the CD-ROM controller 302, is supplied to an arrangement downstream of a bitstream buffer 201 of the next stage configured to decode the MPEG1 bitstream, that is moving picture sequence processing means. The bitstream buffer 201 is comprised e.g., of a frame memory which temporarily stores and subsequently reads out the MPEG1 bitstream supplied thereto for transmitting the read-out bitstream to a variable length code decoding circuit 202.

The variable length code decoding circuit 202 variable length decodes the data supplied thereto from the bit stream buffer 201 and transmits DCT coefficients and quantization step information of the decoded picture to a dequantization circuit 203. The dequantization circuit 203 performs dequantization, which is an inverse operation of quantization during encoding. An inverse DCT circuit 204 of the next stage performs inverse DCT which is an inverse operation of DCT performed during encoding. These operations are performed on the basis of a macro-block as later explained.

A control sequencer 300 receives the motion vector, picture type information and the macro-block type information from the variable length code decoding circuit 202 and controls switches 205, 207, 208, 214, 220 and 221 as later explained, while receiving error recovery bits from the variable length code decoding circuit 202 for effecting error recovery operations.

An output of the inverse DCT circuit 204 is supplied to one of fixed terminals of the changeover switch 205 and to an adder 206. The changeover switch 205 is controlled by the macroblock type information routed from the control sequencer 300. That is, if data supplied to the changeover switch 205 is the intra-macroblock data, the switch outputs the data directly. Conversely, if the data is the non-intra-macroblock data, data supplied from the adder 206 is outputted.

Output data of the changeover switch 205 is sequentially supplied via a selection switch 214 to frame memories 210 to 213 for storage therein so as to be used for picture reproduction (generation of a prediction picture by motion compensation) or display. The changeover switch 214 is sequentially changed over depending on the picture type information transmitted from the control sequencer. For example, frame memories 210 and 211 are used for an I-picture and a P-picture, respectively, while the frame memories 212 and 213 are used for a B-picture. That is, of the data stored in the frame memories 210 to 213, data of the I-picture is directly employed for picture regeneration and display. On the other hand, data of the P-picture or B-picture are summed by the adder 206 to prediction picture data produced by motion compensation of a reference picture and stored in one of the frame memories. The sum data is subsequently used for picture regeneration and display. In MPEG, the B-picture usually is not employed for motion prediction. However, since the frame memories may be freely selected buy the changeover switches 208, 209, the B-picture data may also be employed for motion prediction.

The data stored in the frame memories 210 to 213 are routed via the changeover switch 207 to a display control circuit 222 as a restored picture. An output of the display control circuit 222 is routed from a terminal 223 to a downstream side arrangement, such as a monitoring device, as an output video signal. This changeover switch 207 is changed over by a temporal reference indicating the picture display sequence. The temporal reference is fed from the control sequencer 300.

The frame memories 210 to 213 are controlled in readout by memory readout circuits 217, 215. The data read out from the frame memories 210 to 213 are routed to associated fixed terminals of the selection switches 207 to 209. These selection switches 208, 209 are changed over depending on the picture types transmitted from the control sequencer 300.

If the picture currently decoded is the B-picture, that is, if the picture type is the B-picture, the changeover switches 208, 209 are controlled so that the I-picture and the P-picture, or the P-picture and the P-picture, stored in the frame memories 210, 211, will be read out from the memory readout circuit.

Since the prediction picture may be generated using the pictures stored in all of the frame memories, the changeover switches 208, 209 may also be switched so that motion prediction will be effected using the B-picture stored in the frame memories 212 or 213.

Outputs of the selection switches 208, 209 are transmitted via the memory readout circuits 215, 217 to half pixel processing circuits 216, 218. The half pixel processing circuits 216, 218 perform averaging interpolation as later explained based upon a motion vector MV in the averaging bitstream transmitted from the control sequencer 300.

The picture data processed with averaging interpolation is routed to an adder 219 and thence transmitted to a pertinent fixed terminal of a selection switch 220. An output of the adder 219 is halved (multiplied by ½) so as to be routed to the pertinent fixed terminal of the selection switch 220. Which of the fixed terminals 220a to 220c is selected in the selection switch 220 is determined based upon the macroblock information routed from the control sequencer 300. For example, the half pixel processing circuits 216, 218 effect half pixel processing on the forward picture and on the backward picture, respectively. The data thus half pixel processed on the macroblock basis are selected at pertinent ones of the fixed terminals 220a to 220c depending on the information concerning the reference picture contained in the macroblock type information. The information in the reference picture indicates which of the forward, backward or the forward/backward is to be referenced in performing the motion compensation.

An output of the selection switch 220 is routed to a fixed terminal 221a of a changeover switch 221, the other fixed terminal 221b is fed with "0".

The changeover switch 221 is changed over from one macroblock to another depending on the macroblock type. That is, if the macroblock in the currently decoded picture is an intra-macroblock, or a non-intra-macroblock, a movable contact of the switch is set to the fixed terminals 221b and 221a, respectively. An output of the changeover switch 21 is fed to the adder 206.

The picture information processing apparatus of the embodiment has the function of freely setting the desired combination of the frame memories 210 to 213 by readout control by the memory readout circuits 217, 215 and by selection control of the selection switches 208, 209, as explained in connection with FIG. 1. Thus the forward, backward and the B-picture surface as later explained can all be allocated to the same memory. Although four memories are provided in FIG. 1, only one frame memory suffices for a still picture mode.

In view of the foregoing, the picture information processing apparatus of the embodiment employs the averaging interpolation method exploiting the MPEG system bitstream as hereinafter explained for speedily and easily generating a flicker-free averaged still picture from a high-resolution still picture desired to be displayed on a television screen. The still picture constitutes a moving picture in the present embodiment.

That is, in the present embodiment, after the still picture is written in the frame memory, the averaging bitstream is read out from an averaging bitstream storage region 305 of the ROM 304 and routed to a decoder for the MPEG1 bitstream downstream of the bitstream buffer 201 for generating the flicker-free averaged still picture with the aid of the averaging interpolating method exploiting the MPEG1 bitstream.

The averaging interpolating method is now explained.

With the averaging interpolating method, each still picture is averaging-interpolated on the line-to-line or pixel-to-pixel basis. By the averaging interpolation are meant both the simple averaging interpolation, weighted averaging interpolation and the weighted 3-line averaging interpolation.

The simple averaging interpolation means simple averaging and interpolation in the horizontal or vertical direction, such as finding (A+B)/2, (B+C)/2, (C+D)/2, . . . for pixels A, B, C, . . . Taking an example of averaging interpolation in the vertical direction, if there are vertically adjacent pixels A, B, C and D in lines 1, 2, 3, . . . , the averaged interpolated values in the vertical direction are (A+B)/2, (B+C)/2, (C+D)/2, . . . . as shown in FIG. 2B.

For effecting the simple averaging interpolation by exploiting the MPEG1 bitstream, half-pels are employed. That is, since MPEG allows a half-pel, that is a half pixel position, for motion compensation (MC), this half-pel is utilized.

Figure 2A:
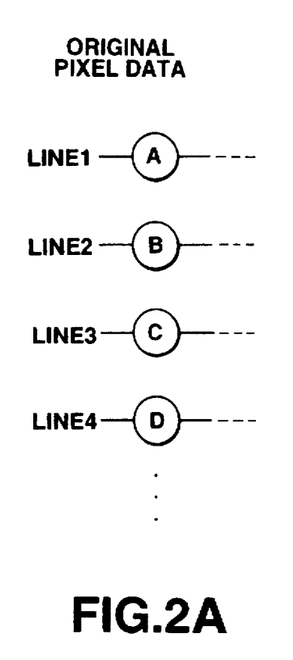
FIGS. 2A and 2B illustrate simple averaging interpolating method among averaging interpolating methods employed in the apparatus embodying the present invention.
Figure 2B:
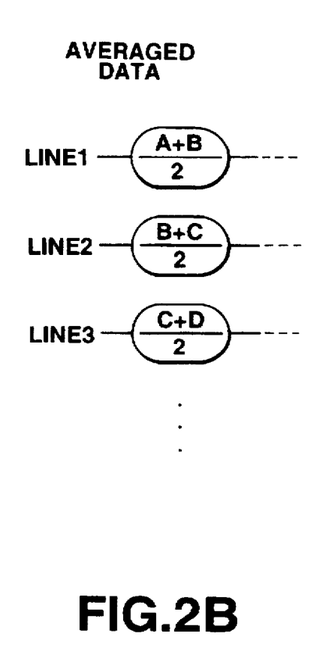

Referring to the example of FIGS. 2A and 2B, the original picture data (reference picture data) of FIG. 2a is first fed to the decoder portion (configuration downstream of the bitstream buffer 201) of the MPEG decoder and restored so as to be stored in the frame memory. An averaging bit stream having a motion vector of shifting the pixel position by 0.5 only in the vertical direction is routed to the decoder. The averaging bitstream is pre-formed and stored in the averaged bitstream storage area 305 of the ROM 304. In the decoder, decoding in accordance with the MPEG rule is carried out by the original picture data restored and stored in the frame memory and by the averaging bitstream vertically shifting the vector by 0.5. Thus the decoder outputs vertically averaged interpolated picture data as shown in FIG. 2B.

Figure 3A:
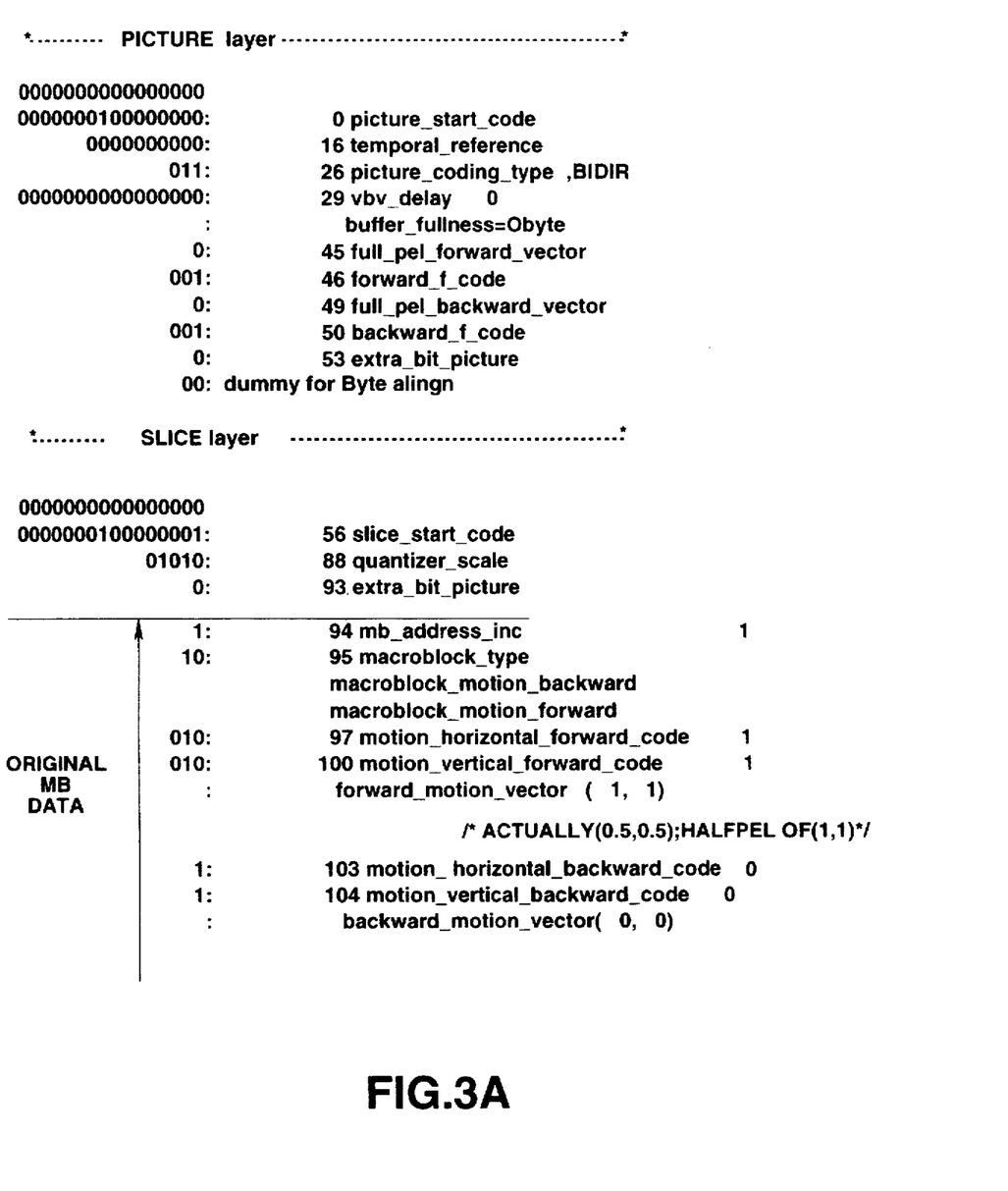
FIG. 3A and 3B illustrate a concrete example of an averaging bitstream.
Figure 3B:
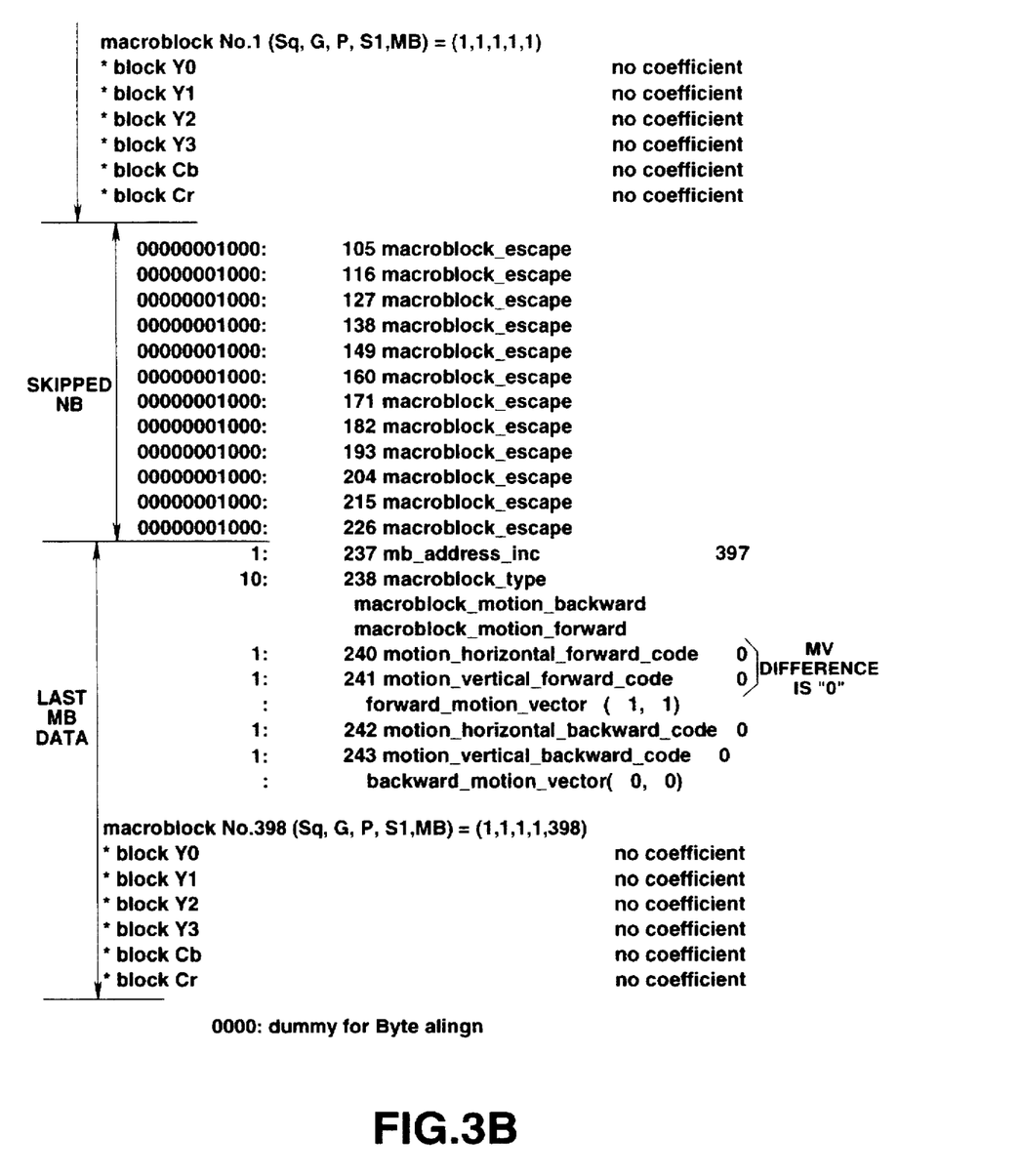

An example of the averaging bitstream is shown in FIGS. 3A and 3B, where FIGS. 3A and 3B together constitute one complete figure. In the present example, the motion picture has components of 0.5 and 0.5 in the horizontal and vertical directions.

The averaging bitstream is separated by variable length decoding circuit 202 into control data, such as macroblock type, picture type, temporal reference, motion vector or quantization scaling and picture data which is zero in the averaging bitstream. The control data is routed to the control sequencer 300 so as to be utilized for controlling the changeover switches or for control during motion picture compensation. The picture data is fed to circuitry downstream of the dequantization circuit 203.

The averaging bitstream employed for this simple averaging interpolation may be such an averaging bitstream in which a macroblock having the vertical vector equal to 1 (in effect a 0.5 vector since a half-pel is 1) and the second and following macroblocks are skip macroblocks. The macroblock having the vertical vector equal to 1 is a pre-set unit, and the skip macroblock is the previous macroblock which is directly employed. This reduces the information quantity of the averaging bitstream. In such case, the picture type is necessarily a B-picture since the vector is also stored as a skip macroblock. Since the MPEG standard provides that the motion vector needs to be "0" for the skip macroblock of the P-picture, the skip macro-block of the B-picture is employed. If the P-picture is employed, the data quantity is increased to about 40 times that when the B-picture is employed since the same first macroblock header needs to be employed repeatedly.

As the skip macroblock, the skip macroblock of total number of macroblocks less 2 is specified, since MPEG standard prescribes that data of the first and last macroblocks need to be included in the bitstream. On the other hand, a macroblock having the vector difference equal to zero is put at the last place since MPEG prescribes that the difference from the motion vector of the previous macroblock is to be sent as the motion vector.

When such averaging bitstream is employed, the original picture data (reference data) is sent to the MPEG decoder and restored so as to be stored in e.g., a frame memory and the resulting averaging bitstream is transmitted to the decoder, in the same manner as described above. The decoder splits the averaging bit stream into various control data and the picture data which in the averaged bitstream is zero. The control data is routed to the control sequencer 300 so as to be employed for controlling the changeover switches or for control purposes for motion compensation. The picture data is routed to a circuitry downstream of the dequantization circuit 203.

The decoder processes the original picture data stored in the frame memory and the averaging bitstream for carrying out decoding in accordance with the MPEG rule.

The bitstream of the picture processed with the simple averaging interpolation has a length on the order of 106 bytes. The macroblock, skip macroblock, vector and the picture will be explained subsequently.

Figure 5A:
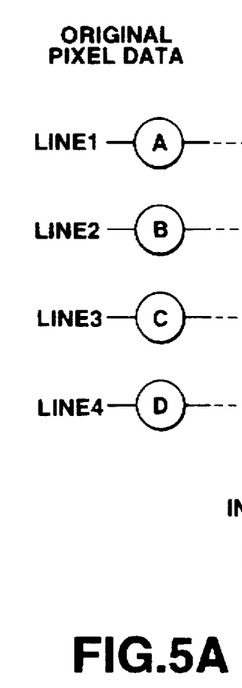
FIG. 5A and 5B illustrate an averaging interpolating method in the horizontal and vertical directions among the averaging interpolating methods employed in the apparatus embodying the present invention.
Figure 5B:
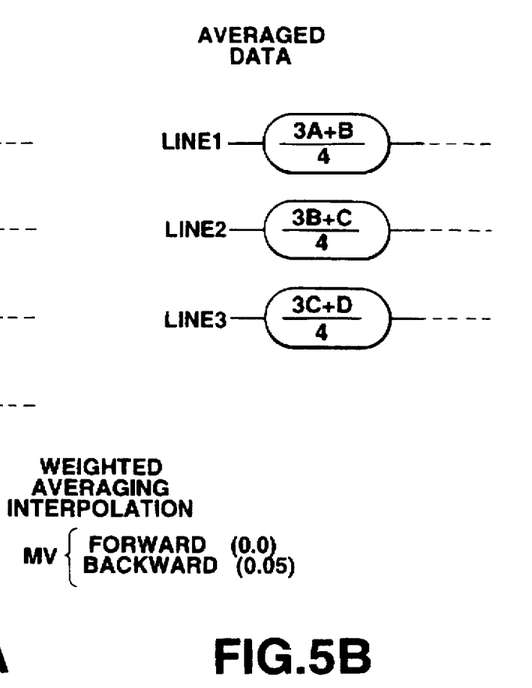

The weighted averaged interpolation means interpolation with weighting and averaging in the horizontal or vertical direction, for producing (3A+B)/4, (3B+C)/4, (3C+D)/4, . . . for pixels A, B, C, . . . Taking an example of averaging interpolation with weighting in the vertical direction, the values resulting from averaging interpolation in the vertical direction for pixels A, B, C, D, . . . in lines 1, 2, 3, . . . . respectively, as shown in FIG. 5A, are (3A+B)/4, (3B+C)/4, (3C+D)/4, . . . . as shown in FIG. 5B.

For carrying out the above-mentioned weighted averaging interpolation using the MPEG1 bitstream, values such as (A+B)/2, (B+C)/2, (C+D)/2, . . . are generated on the forward side using a method similar to the simple averaging interpolating method. On the backward side, values such as A, B, C, . . . are generated using an averaging bitstream having the vector equal to zero. The various values generated on the forward and backward sides are summed together by the decoder and divided by 2. Thus the vertically weighted and averaging-interpolated picture data as shown in FIG. 5B are produced.

The bitstream of the weighted and averaging-interpolated picture has a length on the order of 106 bytes.

Figure 4A:
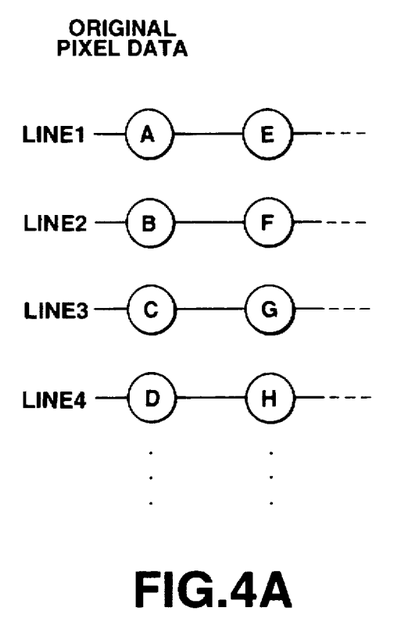
FIG. 4A and 4B illustrate a weighted averaging interpolating method among the averaging interpolating methods employed in the apparatus embodying the present invention.
Figure 4B:
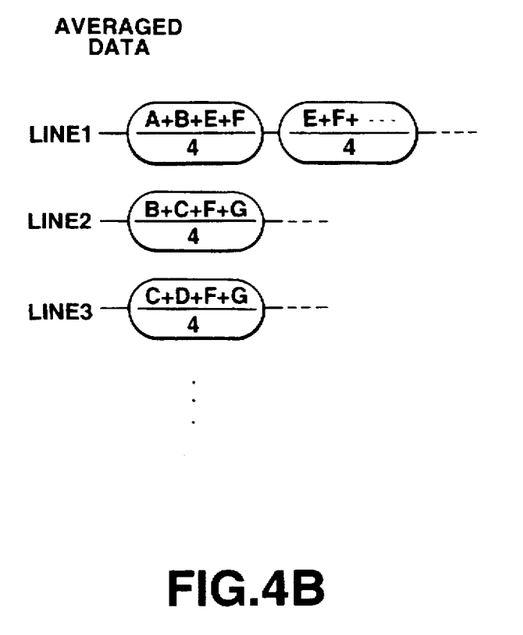

FIG. 4A and 4B shows averaging interpolation in both the horizontal and vertical directions.

If there are vertically adjacent pixels A to H in lines 1, 2, 3, . . . . as shown in FIG. 4A, values resulting from averaging interpolation in both the vertical and horizontal directions become (A+B+E+F)/4, (B+C+F+G)/4, (C+D+G+H)/4, . . . . as shown in FIG. 4B.

Meanwhile, interpolated values of the simple averaging interpolation without weighting are generated from a sole picture, such as a backward side picture.

Figure 6A:
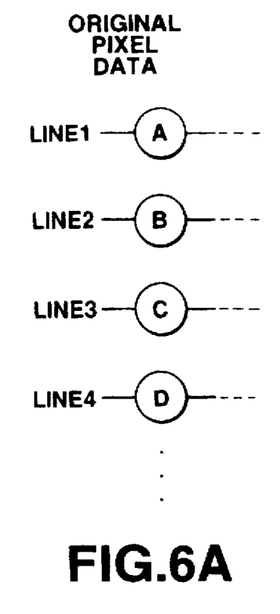
FIG. 6A and 6B illustrate a weighted 3-line averaging interpolating method among the averaging interpolating methods employed in the apparatus embodying the present invention.
Figure 6B:
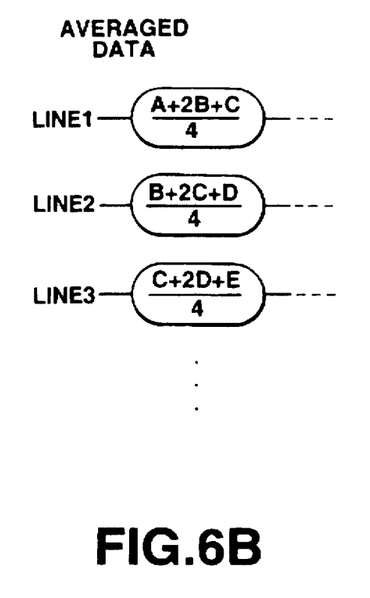

Weighted 3-line averaging interpolation means averaging interpolation of the pixels A, B, C, . . . to produce (A+2B+C)/4, (B+2C+D)/4, (C+2D+E)/4, . . . The vertically neighboring pixels A, B, C, D, . . . on lines 1, 2, 3, . . . as shown in FIG. 6A, if processed with weighted 3-line averaging interpolation, will give (A+2B+C)/4, (B+2C+D)/4, (C+2D+E)/4, . . . . as shown in FIG. 6B.

For performing the weighting 3-line averaging interpolation by utilizing the MPEG1 bitstream, (A+B)/2, (B+C)/2, (C+D)/2, . . . are generated using a method which is the same as the simple averaging interpolation method. On the backward side, (B+C)/2, (C+D)/2, (D+E)/2, . . . are generated using the averaging bitstream, in which a vector is set to 3 (vector 3 means 3×0.5=1.5). The respective values generated on the forward side and the backward size are summed and divided by 2 by the decoder, so that picture data processed with weighting 3-line averaging interpolation is produced at the decoder, as shown in FIG. 6B.

The bitstream of the picture thus processed with weighting 3-line averaging interpolation is of a length approximately equal to 106 bytes.

A variety of interpolating operations become feasible by combining the above-described various averaging interpolating operations. Under the MPEG standards, pixel data can be summed but cannot be subtracted. Thus the combination in the summing direction is employed. It is the simple averaging interpolation and weighted 3-line averaging interpolation that are capable of effectively preventing the flicker. Strong flicker can be eliminated by repeating the weighted averaging interpolation about three times.

The above explanation has been made of an example of preventing occurrence of flicker when displaying a picture of high resolution on a television screen. The averaging interpolating method exploiting the MPEG system is effective for preventing the occurrence of flicker when the television screen is divided into plural regions and the picture of usual resolution is displayed in each divided region.

Figure 7:
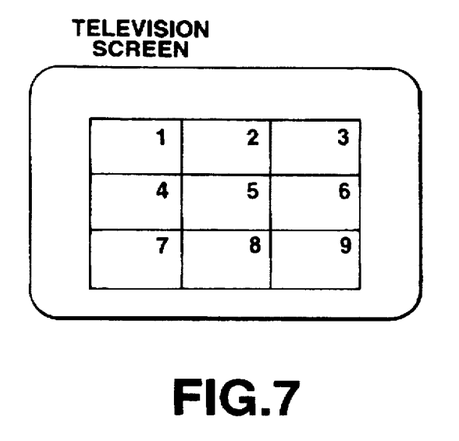
FIG. 7 shows an example of a television screen when split into plural portions.

In each divided region of FIG. 7, an initial scene of each of nine of a large number of tracks, indicating partitions of a picture or an air, recorded on the disc 301, may be displayed by way of disc digest display, or nine scenes obtained on dividing a track into nine portions, may be displayed on one screen, by way of track digest display. Using these functions, it is possible to search for a track or scene desired to be reproduced while plural still pictures displayed on the screen are viewed.

The digest display is now explained.

(a) The disc digest is a function of sticking a reduced-size intra-picture at a leading portion of each moving picture track of the video CD in each of the nine regions divided from the display screen as shown in FIG. 7 in order to permit the viewer to recognize which moving pictures are contained in the disc.

(b) The track digest is a function of dividing the total playback time of a track under reproduction into e.g., eight portions and sticking a reduced-size initial intra-picture within each divided time interval. This function is convenient in that, if the user desires to see which scenes are recorded in a track or to start at a mid portion of a track, he or she is able to select the position desired to be reproduced based on a scene instead of on time.

For such digest display, it is possible to process each display scene with averaging interpolation and subsequently reduce the size of the scene in order to prevent flicker from occurring.

Figure 8:
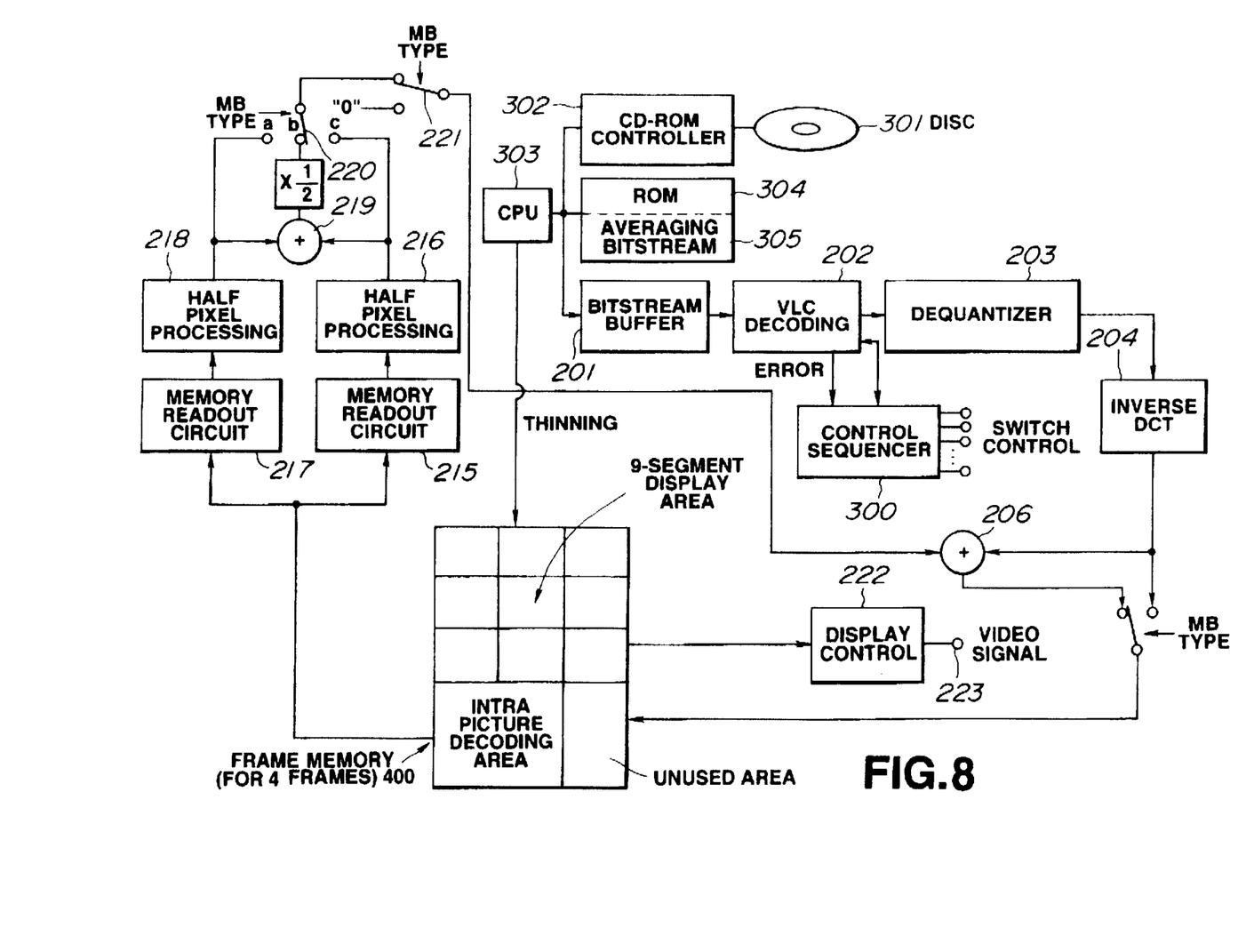
FIG. 8 is a schematic block circuit diagram showing an arrangement of digest display in the picture information processing apparatus embodying the present invention.

FIG. 8 shows a decoder employed for digest display. However, the decoder of FIG. 8 is designed to illustrate the operation of the frame memory portion of FIG. 1 in a simple manner.

A frame memory 400 has a capacity for four frames, and is comprised of an intra-picture decoding function, a 9-scene display function and an unused region. For usual moving picture reproduction, this frame memory is divisionally employed for producing the functions similar to those of FIG. 1.

When the user sends a command for digest display to the CPU, an I-picture is decoded and stored in an intra-picture decoding region in the frame memory 400. The averaging bitstream 305, shown for example in FIG. 3, is read out from the CPU. The averaging interpolation is then performed on the I-picture for digest display so as to be stored again in the intra-picture decoding region. The picture stored in the intra-picture decoding region is thinned out by the CPU so as to be contracted to a pre-set size picture. The reduced-size picture is stored in an associated region of the nine display regions of the frame memory 400 so as to be sequentially displayed on the display. Similar processing is carried out on the next I-picture to be used for digest display.

Figure 9:
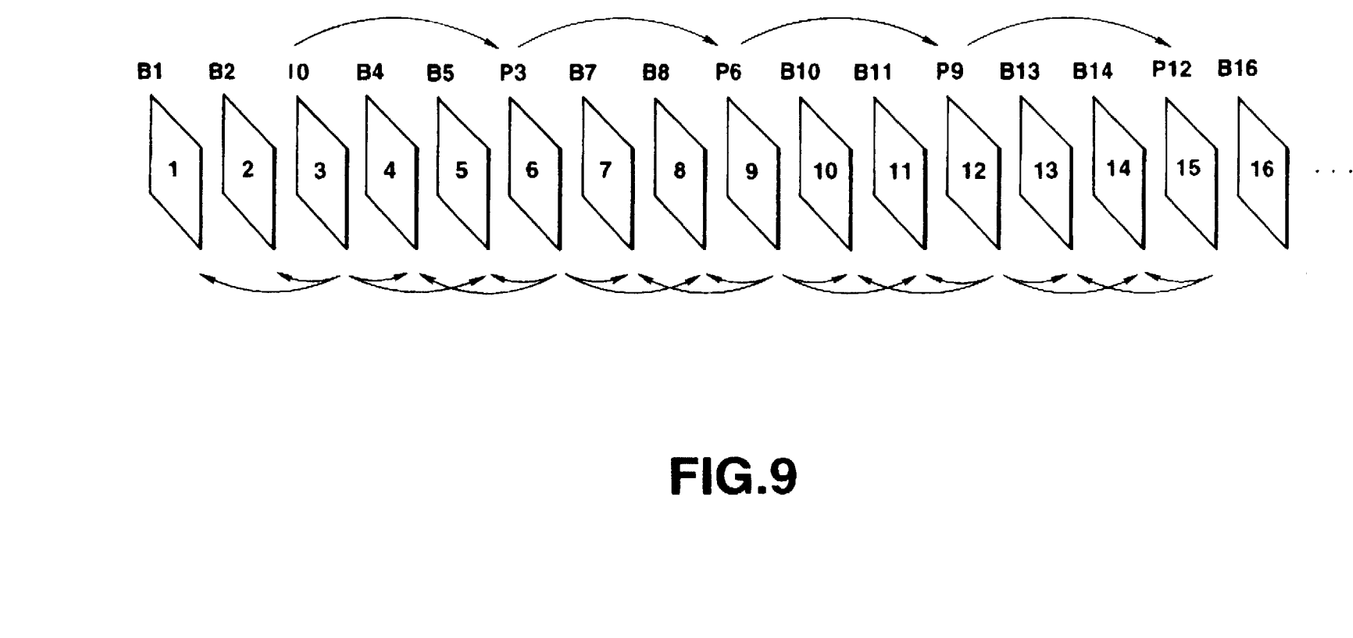
FIG. 9 illustrates the frame-to-frame correlation and picture types in a MPEG format.

The MPEG system is described hereinafter in greater detail. The MPEG system is a compression encoding system for a color moving picture which takes a difference between pictures in order to lower redundancy along the time axis and then employs discrete cosine transform (DCT) and variable length coding in order to lower redundancy along the spatial axis. With the MPEG system, frame pictures are classified into three picture types, namely an intra-coded picture (I-picture), a predictive-coded picture (P-picture) and a bidirectionally-coded picture (B-picture), as shown in FIG. 9, and picture signals are compression coded depending on these picture types. In FIG. 9, I0 etc. denotes the I-picture, B1, B2 etc. denote B-pictures and P3, P6 etc. denote prediction-coded pictures.

With the MPEG system, the I-pictures, among the three picture types, are one-frame picture signals which are directly encoded and transmitted. As for the P-picture, basically a difference from the temporally previous I-picture or P-picture is encoded and transmitted. As for the B-picture, basically a difference from mean values of a temporally previous frame and/or a temporally succeeding frame is found and the difference is encoded and transmitted.

If the difference (encoded difference) is to be transmitted, as in the case of the P- or B-picture, a motion vector with respect to the picture of the frame the difference from which is calculated, that is a prediction picture, is transmitted along with the difference data. The motion vector is the frame-to-frame motion vector for forward prediction and/or frame-to-frame motion vector for backward prediction.

Figure 10:
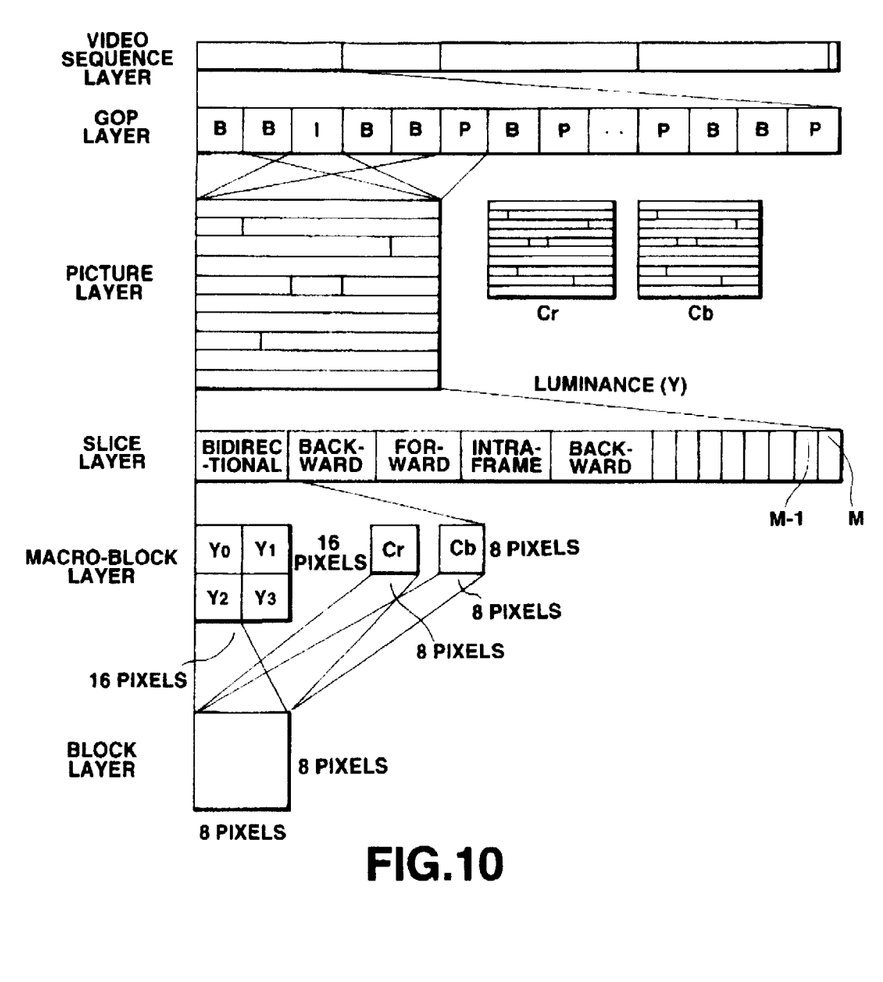
FIG. 10 illustrates a hierarchical structure in the MPEG format.

The data handled by the MPEG system has a hierarchical construction shown in FIG. 10. That is, the hierarchical data construction is comprised of a block layer, a macroblock layer, a slice layer, a picture layer, a group-of-pictures (GOP) layer, and a video sequence layer, viewed from the lower layer side. The data construction is now explained by referring to FIG. 10, beginning from the lowermost layer. First, in the block layer, the unit block of the block layer is made up of neighboring 8×8 pixels of luminance or color difference, that is pixels of 8 lines by 8 lines. The discrete cosine transform (DCT) is applied to each of these unit blocks.

In the above-mentioned macro-block layer, the macroblocks comprise four transversely and vertically neighboring luminance blocks (unit luminance blocks) Y0, Y1, Y2 and Y3, and color difference blocks (unit color difference blocks) Cr and Cb, which are at the same positions on the picture as the above luminance blocks. These blocks are transferred in the sequence of Y0, Y1, Y2, Y3, Cr and Cb. Which is employed as prediction data, that is picture data acting as reference in taking a difference and produced by forward prediction, backward prediction and bidirectional prediction, or whether or not the difference is to be transmitted, is determined with these blocks as units. If the encoding block is identical with the prediction macroblock, data of the macroblock is not transmitted, that is skipped. If a number of macroblocks are skipped in succession, the number of the macroblocks is afforded to the next oncoming non-macroblock.

The slice layer is constituted by one or plural macroblocks which are consecutive to one another in the picture scanning sequence. At the leading end (header) of the slice, the difference of the dc component and the motion vector in the picture are reset. The first macroblock has data indicating the position in the picture so that restoration to its position is possible even an error occurrence. Thus the slice length or the slice beginning position are arbitrary and may be changed depending on error states in the transmission channel. The first and last macroblocks of the slice need to be a non-skip macroblock. In the picture layer, each picture is made up of one or more slices. The picture is classified into the I-picture, P-picture, B-picture and DC intra-coded picture (DC coded (D) picture), depending on the coding types.

In the I-picture, only the information which is closed in the picture during encoding is employed. In other words, picture reconstruction is feasible during decoding only by the information of the I-picture itself. In effect, the difference is not taken, and encoding is directly carried out by DCT. Although this encoding system is generally low in efficiency, it may be inserted into optional places for enabling random accessing and high-speed reproduction.

As for the P-picture, the I- or P-picture which is temporally previous and which has already been decoded is used as a prediction picture, that is as a picture to be used as a reference for taking a difference. In effect, the encoding of the difference from the motion-compensated prediction picture or the direct encoding without taking the difference (intra-coding), whichever is more efficient, is selected on the macro-block basis.

As for the B-picture, three sorts of pictures, namely the I- or P-picture, which is temporally previous and which has already been decoded, the I- or P-picture, which is temporally behind and which has already been decoded, and an interpolated picture produced from both of these pictures, are employed. In this manner, the encoding of the difference of the three sorts of pictures following motion compensation, or the intra-coding, whichever is more efficient, is selected on the macro-block basis.

The DC intra-coded picture or D-picture is an intra-coded picture constituted only by DCT coefficients and cannot be present in the same sequence as the remaining three sorts of pictures.

The group-of-pictures (GOP) layer is constituted by one or more I-pictures and zero or plural non-I-pictures. If the input sequence to the encoder is 1I, 2B, 3B, 4P*5B, 6B, 7I, 8B, 9B, 10I, 11B, 12B, 13P, 14B, 15B, 16P*17B, 18B, 19I, 20B, 21B and 22P, the output of the encoder, that is the input to the decoder, is 1I, 4P, 2B, 3B*7I, 5B, 6B, 10I, 8B, 9B, 13P, 11B, 12B, 16P, 14B, 15B*19I, 17B, 18B, 22P, 20B and 21B. The reason the sequence is interchanged in the encoder is that, for encoding or decoding the B-picture, the I-picture or the P-picture, which is to be the prediction picture for the B-picture and which is temporally behind the B-picture, needs to be encoded temporally previously. The interval of the I-picture and that of the I-picture or the B-picture is arbitrary. Meanwhile, the connecting point of the group-of-pictures layers is indicated by an asterisk * and I, P and B denote the I-picture, P-picture and the B-picture, respectively.

The video sequence layer is constituted by one or plural group-of-pictures layers having the same picture size, picture rate etc.

The encoded bitstream, having the construction as shown in FIG. 10, is now explained.

The video sequence layer includes a 32-bit synchronization code (sequence start code) indicating the beginning of the video sequence layer, and 12-bit information data (horizontal size) specifying the number of pixels of the picture in the transverse direction. The video sequence layer also includes 12-bit information data (vertical size) specifying the number of lines of the picture in the vertical direction, and 4-bit information data (pel aspect ratio) as an index specifying the aspect ratio of the pixel-to-pixel distance. The video sequence layer also includes 4-bit information as an index for the pixel display rate (picture rate) and the information which is the bit rate for limiting the quantity of generated bits and which is rounded off at each 400the bit (bit rate). The video sequence layer also includes 1-bit information data for "1" (reserved bit) and a 10-bit parameter (buffer size) for determining the size of an imaginary buffer for limiting the quantity of generated bits. The video sequence layer also includes a 1-bit flag (constrained parameter flag) specifying that each parameter is within a defined limit, and a 1-bit flag (load intra-quantize matrix) specifying the presence of the intra macroblock quantize matrix. The video sequence layer also includes a 8×64 bit information (intra-quantize matrix) indicating a quantize matrix for intra-macroblock, and a 1-bit load non-intra-quantize matrix indicating the presence of quantize matrix data for the non-intra-macroblock. The video sequence layer also includes 8×64 bit information data (non intra-quantize matrix) indicating the quantize matrix for non-intra-macroblock and a 32-bit synchronization code (extension start code) indicating the presence of extension data. The video sequence layer also includes 8 bit×n information data (sequence extension byte) as determined by ISO for future interchangeability and a 32-bit synchronization code (user data start code) specifying the presence of user data. The video sequence layer finally includes a 8 bit×n information data (user data) for user application and a 32-bit synchronization code (sequence end code) indicating the end of one or more sequences.

The group-of-picture layer includes a 32-bit synchronization code (group start code) specifying the start of a GOP, a 25-bit code (time code) specifying the time as from the start of the sequence and a 1-bit flag (closed gop) specifying that a picture within a GOP may be reconstructed without employing data of other GOPs. The group-of-pictures layer also includes a 1-bit flag (broken link) specifying that data of a previous GOP cannot be used because of editing, and a 32-bit synchronization code (extension start code) specifying that there exists extension data. The group-of-pictures layer also includes 8 bit×n information data (group extension byte) as determined by ISO for future interchangeability and a 32-bit synchronization code (user data start code) specifying the presence of user data. The group-of-picture layer finally includes a 8 bit×n information data (user data) for user application and data of picture layers for one or more I-picture and zero or more I-picture (picture layer data).

The picture layer includes a 32-bit synchronization code (picture start code) specifying the start of a picture layer, and a 10-bit residue value for 1024 (temporal reference) reset at the leading end of a GOP by a value indicating the display sequence. The picture layer also includes a 3-bit value (picture coding type) specifying the picture encoding mode (picture type) and a 16-bit parameter (buffer fullness) specifying the initial state of a buffer on random accessing. The picture layer also includes a 1-bit information data (full pel forward vector) present in the B- or P-picture for specifying if the moving vector definition is pel-or half-pel based and a 3-bit information data (forward f) specifying the forward search range of the moving vector. The picture layer also includes a 1-bit information data (full pel backward vector) present in the B-picture for specifying whether the moving picture definition is pel- or half-pel based and a 3-bit information data (backward f) specifying the backward search range for the moving vector. The picture layer also includes a 1-bit×n flag (extra bit picture) specifying the presence of the extra information picture, and a 8-bit×n information data (extra information picture) as determined by ISO for future application. The picture layer also includes 16-bit "0" information data specifying that there is no flag (extra bit picture) and a 32-bit synchronization code (extra bit code) specifying the presence of extension data. The picture layer also includes 8 bit×n information data (extra information picture ) as determined by ISO for future interchangeability and a 32-bit synchronization code (extension start code) specifying the presence of user data. The picture layer finally includes a 8 bit×n information data (picture extension data) for user application and one or more slice layer data.

The slice layer includes a 32-bit synchronization code (slice start code) specifying the start of a slice layer, and a 5-bit data (quantize scale) defining a quantization width employed in the slice. The slice layer also includes a 1-bit×n flag specifying the presence of an extra information picture, and a 8-bit×n information data (extra information scale) determined by ISO for future application. The slice layer finally includes a 16-bit "0" information data specifying the absence of the above information (extra information picture) and macroblock layer data which is data of one or more macroblock layers.

The macroblock layer includes a 11-bit dummy code (macroblock stuffing) employed for rate control, and a 11-bit code (macroblock escape) corresponding to 33 skip macroblocks. The macroblock layer also includes a 1~11 bit information data specifying the number of the macroblock from the left end of a variable length coded picture plus 1 specifying in turn the number of the skip macroblock previous to the macroblock plus 1 (macroblock address increment), and a 1~8 bit information data present when the macroblock type has a value indicating the quantization width at the variable length code indicating the coding mode of the macroblock (macroblock type). The macroblock layer also includes a 5-bit value specifying the quantization width downstream of the macroblock (quantize scale), and a 1~14 bit information data (motion horizontal forward) which is present when the macroblock type is forward and bidirectional prediction and which is the difference between the horizontal component of the forward motion vector of the macroblock and the vector of the previous macroblock encoded with variable length encoding specified by the information (forward f). The macroblock layer also includes 1~14 bit information data which is a vertical component of the backward motion vector (motion vertical backward), and an information data encoded by variable length encoding which is the variable length encoding information specifying whether there exist coefficients of six blocks within the macroblock (coded block pattern). Finally, the macroblock layer includes a 1~6 block information data specifying that data found to have been transmitted with the information (coded block pattern) is Y0, Y1, Y2, Y3, Cr and Cb, and a 1-bit "1" information data present only for D-picture and specifying the end of the macroblock.

The block layer includes a 2~7 bit variable code information data present for an intra-macroblock for specifying the number of bits of the next DCT and DC difference (dct dc luminance), (dct dc size chrominance), and a 1~8 bit variable length encoded information data specifying the difference between the dc component of the block and the dc component of the previous block (dct dc differential). The block layer also includes a 2~28 bit variable length encoded information data of the dc component present for other than an intra-macroblock (dct coef first), a 2~28 bit variable length encoded information data which is a set of a 0 coefficient and a 0 coefficient directly previous thereto, with the dct coefficients being sent in a zigzag sequence next to the dc component (dct coef next), and a 32-bit code specifying that the coefficients next to the block are all zero (end of block).

What is claimed is:

1. A method for processing a picture, comprising the steps of:

receiving picture information encoded by a pre-set encoding method;

generating averaging information which specifies an interpolation method to be performed on the received picture information;

decoding said picture information by a decoding method corresponding to said encoding method;

storing the decoded picture information;

reading out the stored decoded picture information stored for processing the decoded picture information with said interpolation method;

outputting the interpolated decoded picture information as a picture for display; and thinning out the interpolated picture information for generating a reduced-size picture, outputting the reduced-size picture as a picture for display, wherein said decoded picture information is stored in a memory having a display region for storing a pre-set number of reduced-size pictures, and all of the reduced-size pictures stored therein are output as pictures for display each time said reduced-size picture is stored.

2. The method for processing a picture as claimed in claim 1, wherein said averaging information includes vector information concerning an extent of vertical and horizontal shifting of one-frame picture information for performing averaging interpolation.

3. The method for processing a picture as claimed in claim 2, wherein said picture information is a bitstream conforming to the MPEG standard.

4. The method for processing a picture as claimed in claim 3, wherein said averaging information is a bitstream conforming to the MPEG standard.

5. The method for processing a picture as claimed in claim 4, wherein said averaging information is a bitstream of a B-picture.

6. The method for processing a picture as claimed in claim 2, wherein said decoded picture information is processed with half-pel definition in said interpolation method.

7. The method for processing a picture as claimed in claim 4, wherein said step of decoding said picture information comprises the steps of:

separating control data and compressed data from said picture information and said averaging information;

de-quantizing said compressed data for generating coefficient data;

inverse orthogonal transforming said coefficient data for generating difference picture data; and summing said difference picture data and reference picture data for generating prediction picture data which is outputted.

8. An apparatus for processing a picture, comprising:

means for receiving picture information encoded by a pre-set encoding method;

means for generating averaging information which specifies an interpolation method to be performed on the received picture information;

means for decoding said picture information by a decoding method corresponding to said encoding method;

memory means for storing the decoded picture information;

means for reading out the decoded picture information stored in said memory means for processing the decoded picture information with said interpolation method;

means for outputting the interpolated decoded picture information as a picture for display; and means for thinning out the interpolated picture information for generating a reduced-size picture, said outputting means outputting the reduced-size picture as a picture for display, wherein said memory means has a display region for storing a pre-set number of reduced-size pictures, said outputting means outputting all of the reduced-size pictures stored therein as pictures for display each time said reduced-size picture is stored.

9. The apparatus for processing a picture as claimed in claim 8, wherein said averaging information includes the vector information concerning the extent of vertical and horizontal shifting of a one-frame picture information for performing averaging interpolation.

10. The apparatus for processing a picture as claimed in claim 9, wherein said interpolating means interpolates the decoded picture information with half-pel definition for generating a prediction picture.

11. The apparatus for processing a picture as claimed in claim 9, wherein said picture information is a bitstream conforming to the MPEG standard.

12. The apparatus for processing a picture as claimed in claim 11, wherein said averaging information is a bitstream conforming to the MPEG standard.

13. The apparatus for processing a picture as claimed in claim 12, wherein said averaging information is a bitstream of a B-picture.

14. The apparatus for processing a picture as claimed in claim 13, wherein said means for decoding the picture information comprises:

means for separating control data and compressed data from said picture information and said averaging information;

means for de-quantizing said compressed data for generating coefficient data;

means for inverse orthogonal transforming said coefficient data for generating difference picture data; and means for summing said difference picture data and reference picture data for generating prediction picture data which is outputted.

15. The apparatus for processing a picture as claimed in claim 14, wherein said averaging information further comprises:

a temporal reference specifying the picture display sequence;

data specifying that the picture type of a corresponding picture is a B-picture;

a macroblock type specifying whether the corresponding macroblock is intra or non-intra block;

the information specifying that said compressed data are all zero; and the information that the macroblock next following the first macroblock is a skip macroblock.

* * * * *